July 17, 1928.
C. L. SAMS
1,677,729
AUTOMATIC CUT-OFF VALVE FOR GAS LINES
Original Filed Jan. 8, 1927
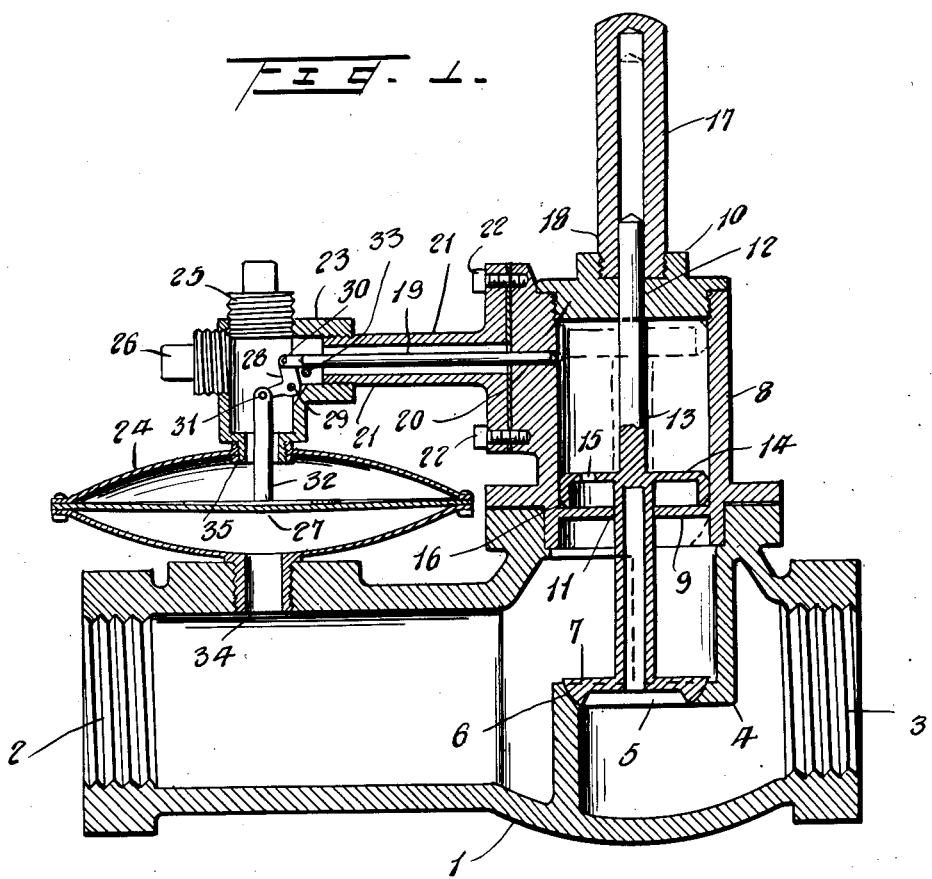
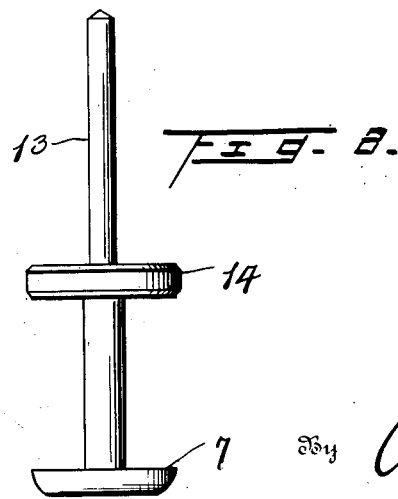
Inventor
C. L. Sams.

Patented July 17, 1928.

1,677,729

UNITED STATES PATENT OFFICE.

CHARLES L. SAMS, OF BRIDGEPORT, OHIO.

AUTOMATIC CUT-OFF VALVE FOR GAS LINES.

Application filed January 8, 1927, Serial No. 159,955. Renewed June 11, 1928.

This invention relates to improvements in the automatic cut-off valve for gas lines constituting the subject-matter of my copending application filed September 22, 1925, Serially Numbered 57,899, and allowed November 5, 1926.

The present invention has for one of its objects to improve and simplify the general construction of the means for controlling the valve proper of the automatic cut-off valve, and to provide means of this character which shall include a valve supporting pin adapted to be held in projected or active position or in retracted or inactive position by a diaphragm, the diaphragm functioning to hold the pin in active position when the pressure is on and to hold it in inactive position when the pressure is cut off.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is a sectional view taken on a vertical plane extending centrally and longitudinally through the valve embodying the present invention, and Figure 2 is a detail view in side elevation of the valve, valve stem and valve piston.

Referring to the drawing by reference characters, 1 designates a valve casing which is provided with an inlet 2, an outlet 3 and an intermediate partition 4. The partition 4 is provided in the horizontal portion thereof with an opening 5 of which the wall constitutes a seat 6 for a valve 7. A cylinder 8 extends upwardly from the casing 1 in axial alinement with the valve seat 6. The cylinder 8 is provided adjacent its lower end with a rigid diaphragm 9, and the upper end thereof is closed by a nut 10. The diaphragm 9 and nut 10 are provided with axial alined openings 11 and 12, respectively, for the slidable reception of the stem 13 of the valve 7. A piston 14 is slidably mounted in the cylinder 8, and is fixed to the valve stem 13. The piston 14 is hollow, and is provided in the circular wall thereof with a port 15. The lower edge of the annular wall of the piston 14 is provided with a tapered notch 16. The valve stem 13 extends above the nut 10 into a cap 17 which is removably engaged with the nut as shown at 18.

The valve 7 seats by gravity, and is adapted to be held in raised or unseated position by a pin or bolt 19. The cylinder 8 is provided with a horizontal opening 20 for the reception of the pin 19, and the inner end of the pin is tapered and engages in the notch 16 of the piston 14. A horizontal sleeve 21 is secured by bolts 22 to the cylinder 8 about the opening 20 therein. A coupling 23 is secured to the sleeve 21 and to a casing 24 which is secured to the casing 1. The coupling 23 is provided with right angularly related openings which are closed by removable plugs 25 and 26. The casing 24 communicates with the inlet end of the casing 1, and is provided with a flexible diaphragm 27. An angle lever 28 is pivoted as at 29 within the coupling 23, and is pivotally connected as at 30 to the pin 19 and as at 31 to a rod 32 which extends upwardly from and is secured to the diaphragm 27. A stop 33 is arranged within the coupling 23 to limit the movement of the pin 19, lever 28 and rod 32 by and as the result of the upward movement of the diaphragm 27. The stop 33 also constitutes a support for one end of the pin 19, the other end thereof being supported by the cylinder 8. The casing 24 is secured to the casing 21, and communication between these casings is established, by means of a nipple 34 carried by the casing 24 and having threaded engagement with the casing 1. The coupling 23 is secured to the casing 24 by a nipple 35 through which the rod 32 extends.

In practice, when gas or other fluid is flowing through the valve, the pin 19 is held in active or projected position by and as the result of the pressure of the fluid against the under side of the diaphragm 27. When the supply of fluid to the valve is cut off, the pin 19 is moved into and held in retracted position by the diaphragm 27. When the pin 19 is in active position it engages the piston 14 and supports the valve 7 in raised or unseated position. When the pin 19 is in inactive position the valve 7 is in lowered or seated position, and cannot move from this to its raised or unseated position except by manual operation thereof. To gain access to the stem 13 when it is desired to raise the valve 7, it is only necessary to remove the cap 17. The port 15 in the piston 14 permits the piston to move freely in the cylinder 8, with the result that it will when released readily move into seated position and may be easily raised into unseated position.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

An automatic cut-off comprising a casing having a valve seat, a valve arranged within the casing and adapted when in closed position to occupy the seat, a cylinder extending from the casing in axial alinement with the valve seat, said cylinder being closed at its ends and provided in a side thereof with a radial opening, a piston slidably arranged within the cylinder and provided with an axial opening, a stem secured to the valve and piston, a sleeve extending at right angles from the cylinder and communicating with the opening therein, a second casing secured to and communicating with said first casing, an elbow secured to and communicating with the sleeve and second casing, a diaphragm within the second casing, an angle lever pivoted within the elbow, a rod secured to the diaphragm and elbow, and a pin arranged within the sleeve and the opening in the cylinder and connected to the lever.

In testimony whereof I affix my signature.

CHARLES L. SAMS.